Jan. 13, 1925.                                    1,522,728
B. KROHN
EMERGENCY CLAMP FOR STORAGE BATTERIES
Original Filed Dec. 7, 1921
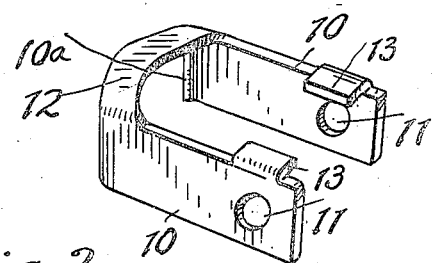
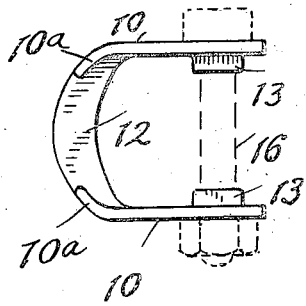
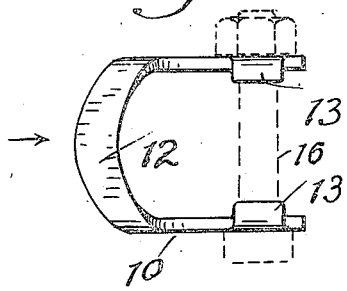
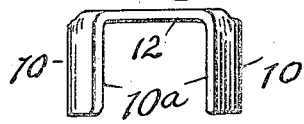
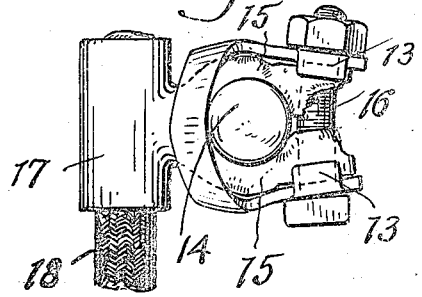
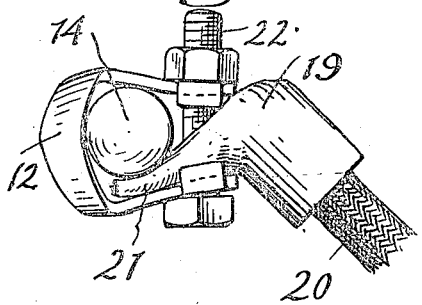
Inventor:
Benjamin Krohn
by
Thurston Kwor & Hudson
attys.

Patented Jan. 13, 1925.

1,522,728

UNITED STATES PATENT OFFICE.

BENJAMIN KROHN, OF CLEVELAND, OHIO.

EMERGENCY CLAMP FOR STORAGE BATTERIES.

Application filed December 7, 1921, Serial No. 520,525. Renewed November 6, 1924.

*To all whom it may concern:*

Be it known that I, BENJAMIN KROHN, a citizen of the United States, residing at Cleveland, in the county of Cuyahoga and State of Ohio, have invented a certain new and useful Improvement in Emergency Clamps for Storage Batteries, of which the following is a full, clear, and exact description.

This invention relates to a device for permitting a more or less temporary connection to be made between the terminal post of a storage battery and a terminal clamp which has been rendered ineffective by corrosion.

It is customary for storage battery manufacturers to connect the two flexible conductors or terminals to the terminal posts of the batteries by so-called terminal clamps. These terminal clamps have the equivalent of jaws which are adapted to be clamped about the terminal posts by bolts and they have socketed portions which receive the ends of the flexible conductors and are designed to be soldered thereto.

Terminal clamps of this nature are now used very extensively, and practically to the exclusion of the terminal members which were heretofore designed to be lead-burned or soldered to the terminal posts.

Notwithstanding the fact that the terminal clamps are lead coated, they are corroded by the acid electrolyte of the battery, and it is usually the jaws, and in fact, the portions of the jaws which receive the clamping bolt which are corroded away. When the corrosion becomes very extensive, the clamp can be no longer secured to the terminal post by the bolt, and when this condition exists, a loose connection develops. Until the connection is repaired, the battery is rendered useless, and if the motor vehicle with which the battery is used depends for its ignition on the battery, as is usually the case, the vehicle cannot be started.

The subject matter of this invention is in the nature of an emergency clamp consisting of a device which is designed to be fitted to or around what remains of the terminal clamp after serious corrosion has taken place, the device being so constructed that it will enable the clamp to be secured to the terminal post, at least for a sufficient length of time to enable the driver of the car to reach a service station where a new terminal clamp can be applied for permanent service.

The invention may be briefly summarized as consisting in certain novel details of construction, and combinations and arrangements of parts which will be described in the specification and pointed out in the appended claims.

In the accompanying sheet of drawings wherein I have shown the preferred embodiment of the invention, Fig. 1 is a perspective view; Fig. 2 is a top plan view; Fig. 3 is a bottom view; Fig. 4 is an end view looking toward the right of Fig. 2, showing the emergency clamp embodying the invention; and Figs. 5 and 6 are top plan views showing the emergency clamp applied to two different styles of terminal clamps, and showing how the emergency clamps can be made use of to permit the terminal clamps to be electrically connected to terminal posts of a battery when the terminal clamps have been corroded, as for example, as indicated in these views.

Referring now to the drawings, it will be observed that the clamp comprises two substantially parallel side portions 10—10, which side portions are designed to extend about or lie alongside opposite sides of the terminal clamp. At one end of the device these side portions 10 have openings 11, which are designed to accommodate the bolt normally employed for causing clamping engagement between the terminal clamp and the terminal post of the storage battery. At the opposite end of the device the top portions of the side portions are connected together by a bridging member 12, which is flat for a major portion of the distance between the side portions, but is preferably curved outwardly in an endwise direction as viewed in plan (see Fig. 2). Beneath the bridge 12 the end portions of the sides 10 of the device are preferably curved inwardly as best shown at 10ª in Fig. 3 and 4, these portions 10ª being generally designed to fit about the correspondingly rounded portion of the terminal clamp which receives the terminal post of the battery. Additionally the free ends of the sides 10 of the device, i. e., the ends having the bolt openings 11 are preferably provided with inturned tongues 13 which are normally designed to rest upon the jaws of the terminal clamp to prevent the device swinging or turning about the axis of the bolt when the device is applied to a corroded terminal clamp for the purpose intended.

The emergency clamp is preferably formed of brass or other suitable material having the right degree of conductivity, strength and flexibility, and preferably the device is lead coated to minimize corrosion.

The construction of this emergency clamp is such that it can be utilized with practically all forms of terminal clamps which are in use at the present time, and while there are a variety of different designs and forms of terminal clamps, I have illustrated two of them in the drawings. In Fig. 5 I have shown a common form of terminal clamp, this clamp having a body portion which envelopes a terminal post which is indicated at 14, the body portion being split to form jaws 15, having openings to receive a clamping bolt 16 by which the jaws are caused to tightly engage the post. Likewise the clamp has an integral portion 17, which receives and to which the end of the flexible conductor 18 is adapted to be soldered. In Fig. 5 I have shown the end of one of the jaws 15 partially corroded away to an extent such that the bolt 16 would not hold, and therefore ordinarily the clamp could not be utilized to form an electrical connection between the conductor 18 and the terminal post. In this figure I have shown my emergency clamp applied so as to permit the clamp, even in its extremely corroded state to be applied to the terminal post. It will be observed that the sides 10 of the emergency clamp extend along the sides of the corroded terminal clamp and that the bridging member extends across the top of the terminal clamp. Likewise it will be observed that the bolt 16 is extended through the openings 11 of the emergency clamp, and that the sides of the latter have been drawn inward, pulling the jaws of the terminal clamp against the terminal post, and providing a sufficient anchorage for the bolt so that it will hold the parts in tight clamping engagement with the terminal post.

In Fig. 6 the terminal clamp here shown, consists of a body 19 with a portion socketed to receive the end of the conductor 20, and having a clamping portion 21 designed to envelope the terminal post 14, and to be clamped thereto by the bolt 22. In this instance substantially one-half of the post enveloping the clamping portion 21 is shown as corroded away, so that without my device it would be utterly impossible to electrically connect the terminal clamp and the post, but by extending the emergency clamp around the post and around the remaining post clamping portion 21, and by extending the bolt through the openings in the sides of the emergency clamp as shown, and tightening the nut on the bolt, the terminal clamp, or what remains of it, is clamped against the post so as to effect the proper electrical connection between the post and the flexible conductor 20 for a sufficient time, at least, to permit the driver to reach a service station where a new terminal post can be provided. It will be noted in this instance, that the openings of the terminal clamp for the passage of the bolt 22 are in this instance located between the terminal post 14 and the conductor. This requires a substantial reversal of the position of the emergency clamp with respect to the portion of the terminal clamp receiving the flexible conductor as regards the location shown in Fig. 5. And in this instance the bridging portion is caused to engage the cylindrical or tapered body of the post so that the three elements, i. e. the post, terminal clamp and emergency clamp are drawn tightly together. On the other hand, with the type of terminal clamp shown in Fig. 5, the bridging portion of the emergency clamp simply extends over the top of the clamp and may rest thereon.

I do not desire to be confined to the exact details shown, but aim in my claims to cover all modifications which do not involve a departure from the spirit and scope of the invention.

Having described my invention, I claim:

1. Means for permitting a temporary connection to be made between the terminal post of a storage battery and a terminal clamp which has been rendered substantially ineffective by corrosion, comprising a device adapted to be fitted around the terminal clamp, and having openings to receive the clamping bolt of the terminal clamp.

2. Means for securing to the terminal post of a battery a terminal clamp which has been rendered substantially ineffective by corrosion, comprising an auxiliary clamp adapted to be secured to the terminal clamp, said auxiliary clamp having portions adapted to envelope portions of the clamp and terminal post, and serving to clamp them together.

3. Means for permitting a temporary connection to be made between the terminal post of a storage battery and a terminal clamp which has been rendered substantially ineffective by corrosion, comprising a device adapted to be fitted around the terminal clamp, said device comprising substantially parallel clamping portions, and a bridging portion.

4. Means for permitting a temporary connection to be made between the terminal post of a storage battery and a terminal clamp which has been rendered substantially ineffective by corrosion, comprising a device adapted to be fitted around the terminal clamp, said device comprising a pair of strap-like portions or jaws, provided at one end with openings, and at the other end with a bridging portion extending across the top of the device.

5. Means for permitting a temporary connection to be made between the terminal post of a storage battery and a terminal clamp which has been rendered substantially ineffective by corrosion, comprising a device adapted to be fitted around the terminal clamp, said device having a pair of strap-like sides or jaws provided at one end with openings, and at the other end having a bridging portion, and said sides also having inturned ears or tongues.

In testimony whereof, I hereunto affix my signature.

BENJAMIN KROHN.